DEVICE FOR LIMITING THE SPEED OF ROTATION OF A BODY

Original Filed Nov. 26, 1962

Inventor
Jakhin Boas Popper
By Olson, Mecklenberger,
von Holst, Pendleton & Hauman Attorneys

DEVICE FOR LIMITING THE SPEED OF ROTATION OF A BODY

Original Filed Nov. 26, 1962

Inventor
Jakhin Boas Popper
By Olson, Mecklenberger,
von Holst, Pendleton & Hanson Attorneys

DEVICE FOR LIMITING THE SPEED OF ROTATION OF A BODY

Original Filed Nov. 26, 1962

Inventor
Jakhin Boas Popper
By Olson, Mecklenburger,
von Holst, Pendleton & Neuman Attorneys United States Patent Office Re. 26,542
Reissued Mar. 11, 1969

26,542
DEVICE FOR LIMITING THE SPEED OF ROTATION OF A BODY

Jakhin Boas Popper, Kiryat Motzkin, Israel, assignor to The State of Israel, Ministry of Defense, Hakirya, Tel Aviv, Israel Original No. 3,149,702, dated Sept. 22, 1964, Ser. No. 239,996, Nov. 26, 1962. Application for reissue Aug. 30, 1965, Ser. No. 483,622
Claims priority, application Israel, Nov. 26, 1961, 16,378
U.S. Cl. 188—185 14 Claims
Int. Cl. B60t *1/100*

Matter enclosed in heavy brackets [ ] appears in the original patent but forms no part of this reissue specification; matter printed in italics indicates the additions made by reissue.

This invention relates to a speed limiting device for limiting the speed of rotation of a body such as, for example, a shaft adapted to rotate under the influence of an applied torque. The device is particularly designed to ensure that, with an untoward increase in the magnitude of the applied torque the speed of the body does not undergo a corresponding increase. In this sense the device limits any speed increase.

The invention is of particular but not exclusive application to the dial mechanism of a telephone handset. In this case the rotating shaft whose speed of rotation is to be limited carries with it the dial while the applied torque arises out of the action of a tension spring on the dial so as to return the dial to its starting position after its manual displacement. It is of importance, for correct operation of the dial mechanism, that the speed of return of the dial should not exceed a maximum value. Excessive speed of return may, however, occur when to the torque of the tension spring there is added, for example, a manually applied torque. In order to avoid an excessive speed of return as a result of the application of this manual torque known forms of speed limiting devices are provided. In general, in such known devices the rotating shaft is coupled via a suitable gear train arrangement with a centrifugal governor so that when the speed of the shaft exceeds a certain amount the centrifugal governor operates so as to effect a reduction in the speed.

It is an object of the present invention to provide a new and improved speed limiting device which is of much more simple construction and operation than the known devices referred to above.

According to the present invention there is provided a speed limiting device for limiting the speed of rotation of a body adapted to rotate about an axis under the influence of an applied torque and comprising at least one braking member slidable in a transverse direction with respect to said axis and an abutment bearing member, one of said members being adapted to rotate with said body and the other of said members being secured against rotation and being adapted to be struck by said one member during its rotation, whereby the braking member is constrained to slide in said transverse direction.

With such a speed limiting device in accordance with the invention the magnitude of the braking torque developed as a result of the successive impacts of the braking member with the or each abutment is a function of the speed of rotation of the rotating member and, in consequence, is a function of the magnitude of the torque applied to the body to cause it to rotate. In consequence, therefore, any increase in the applied torque is accompanied by a corresponding increase in the braking torque and, as a result, the speed of rotation of the body is limited and does not increase proportionately to the increase in the applied torque.

For a better understanding of the present invention and to show how the same may be carried out in practice, reference will now be made to the accompanying drawings, in which.

Figure 2:
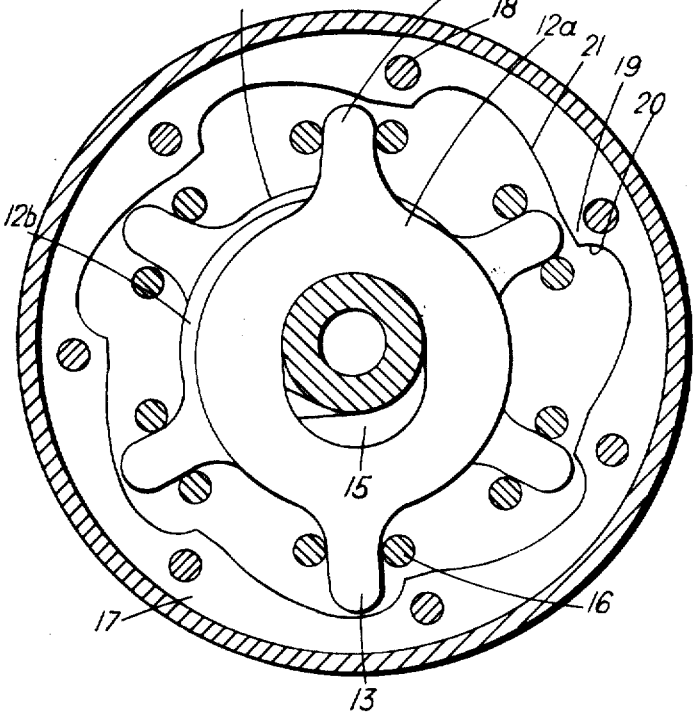
FIGS. 1 and 2 are respectively longitudinal sectional and cross-sectional views of part of a telephone dial mechanism incorporating a first form of speed limiting device in accordance with the invention.
Figure 1:
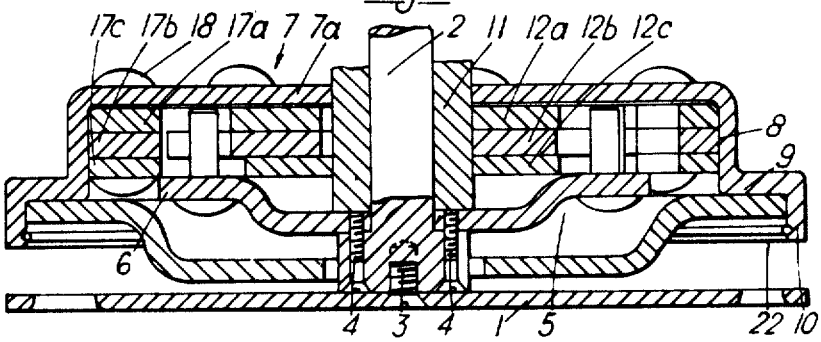

As seen in FIGS. 1 and 2 of the drawings, a telephone dial 1 is centrally secured to a rotatable shaft 2 by means of a bolt 3. The shaft 2 is furthermore secured by means of bolts 4 to an annular dished plate 5 having an outwardly directed flange rim 6. A fixed casing 7 surrounds the shaft 2 and the plate 5 and comprises a planar base 7a through a central aperture of which passes the shaft 2, a cylindrical skirt portion 8, an outwardly directed flange portion 9 and a downwardly directed flange portion 10. The shaft 2 rotates together with a bearing sleeve 11 which extends through the casing 7.

Three centrally apertured discs 12a, 12b and 12c surround the sleeve 11, each disc 12 being formed integrally with a pair of diametrically opposite outwardly directed lugs 13.

Each disc 12 is formed with a centrally disposed slightly elongated slot 15 having rounded edges and having a width substantially equal to the external diameter of the sleeve 11 and a length greater than this external diameter.

As can be seen from FIG. 2 of the drawings, the superimposed discs 12 constituting braking members are so arranged that the three pairs of opposing lugs 13 are angularly equally spaced from one another. This disposition is preserved and the discs 12 are prevented from rotating with respect to the shaft 2 by the provision of guide pin pairs 16 secured to the flange 6 of the plate 5, each projection being disposed between a pair of guide pins. The discs 12a, 12b and 12c are respectively surrounded by superimposed rings 17a, 17b and 17c together constituting an abutment bearing member which are secured together and to the surrounding casing 7 by means of bolts 18. Each ring 17 is formed with a plurality of equi-angularly spaced projecting teeth 19, each tooth having a steeply sloping trailing edge 20 and a gradually sloping leading edge 21. The three rings 17 are so superimposed that their teeth 19 constituting the abutments are all accurately aligned one with the other.

A tension spring (not shown) is provided which is secured at one end of the casing 7 and at the other end to the rotating shaft 2, the effect of the tension spring being to return the dial after rotation in a clockwise direction to its starting position.

In use, upon rotation of the dial 1, when an outwardly directed lug 13 of one of the braking discs 12 strikes an inwardly directed tooth 19, the braking disc 12 is displaced transversely to the axis of rotation of the dial and so the diametrically opposed outwardly directed lug 13 is displaced to a position wherein it strikes an inwardly directed tooth 19 upon further rotation of the dial 1. In consequence of the successive striking of the inwardly directed teeth 19 by the outwardly directed lugs 13 of the braking discs 12, a braking torque is exerted on the rotating shaft 2, the magnitude of this braking torque being directly related to the magnitude of the torque exerted on the dial so as to secure its rotation. Thus, should an increase occur in the torque applied to the dial so as to rotate it, the braking torque is also increased and, in consequence, any increase in speed of rotation of the dial as a result of the increased applied torque is limited.

In the case of a telephone dial it is of importance to effect the speed limitation in connection with the return movement of the dial under the influence of the tension spring. The forward movement of the dial under the influence of a manually applied torque need not necessarily be so limited or not to the same extent. In the case of the embodiment just described this selective speed limitation of rotation of the dial in the return direction is effected by providing the inwardly directed teeth with a gradually inclined leading edge 21 and a steeply inclined trailing edge 20. Thus, when the dial is manually displaced in a clockwise direction only a minimal braking torque is exerted on the dial and, in consequence, the dial can be rotated at a considerable speed. When, however, the dial is rotated in an anti-clockwise direction under the restoring torque of the spring, a substantial braking torque is exerted on the dial and this braking torque resists attempts excessively to increase the speed of return of the dial by supplementing the applied torque of the spring by, for example, a manually applied torque.

Figure 4:
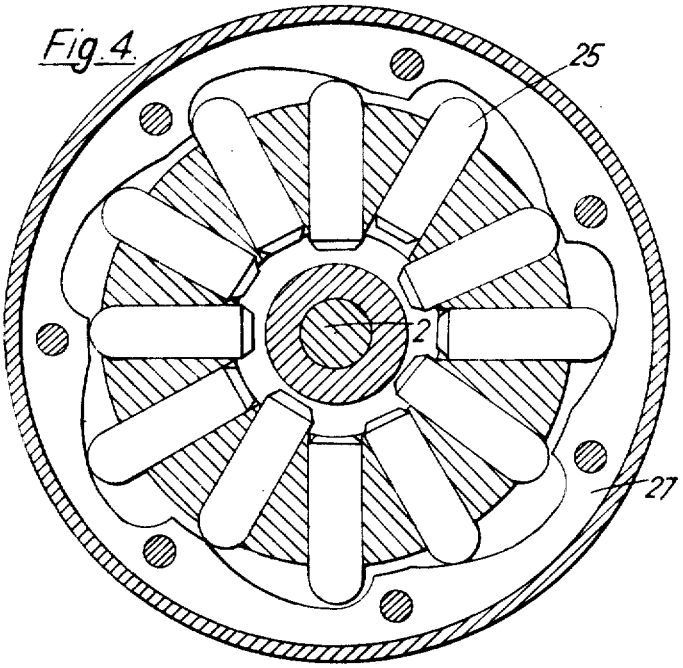
FIGS. 3 and 4 are respectively longitudinal sectional and cross-sectional views of part of a telephone dial mechanism incorporating a second form of speed limiting device in accordance with the invention.
Figure 3:
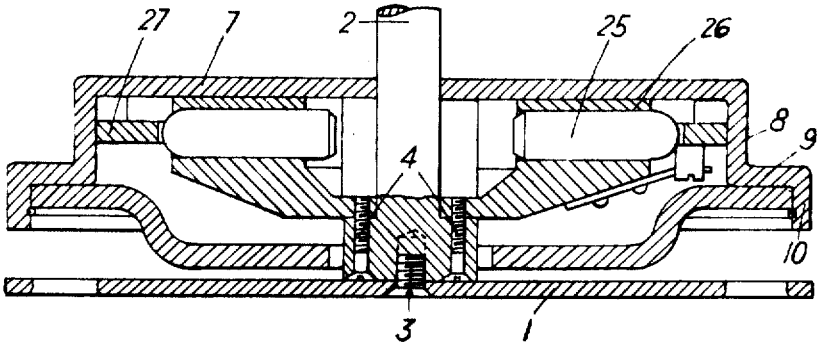

FIGS. 3 and 4 show a modification of the speed limiting device as shown in FIGS. 1 and 2. In the following description parts of the device which are identical with corresponding parts shown in FIGS. 1 and 2 will retain the same reference numbers. In this modification the braking discs 12 are replaced by braking pins 25 which are respectively disposed in radially directed apertures 26 formed in a cylindrical support member secured by means of bolts 4 to the shaft 2. Each braking pin 25 is displaceable transversely with respect to the axis of rotation of the shaft. The braking pins are surrounded by a ring 27 secured to the casing 7, which ring is provided with internally directed teeth similar to the teeth 19 of the ring shown in FIGS. 1 and 2 of the drawings.

The operation of the device shown in FIGS. 2 and 3 is similar to the operation of the device shown in FIGS. 1 and 2. Whereas in the former embodiment impact between the outwardly directed lugs and the inwardly projected teeth resulted in the displacement of the entire discs, in the embodiment just described with reference to FIGS. 3 and 4 impact between the pins and the teeth results in the displacement of the pins, the subsequent return movement of the pins in an outward sense being effected under centrifugal force.

It can be shown that the angular speed of the dial which is subjected to an applied rotational torque M approximately equals $\sqrt{MQ}$ where Q is a constant determined by the dimensions of the components of the speed limiting device.

While in the arrangement described above, the braking members are disposed within a surrounding structure and are arranged to strike abutments formed by inwardly directed projections, the arrangement can be reversed and the braking member can be arranged to rotate around the fixed structure and to strike outwardly directed projections.

Figure 5:
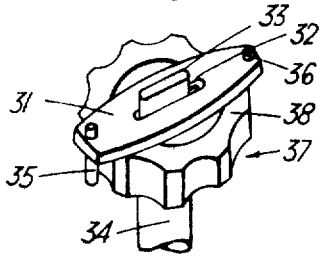
FIG. 5 shows a schematic perspective representation of a further embodiment of a speed limiting device in accordance with the invention.

One such arangement is shown in FIG. 5 of the drawings wherein the braking member is constituted by a rigid strip 31 in which is formed centrally an elongated slot 32 through which extends a flattened shaft 33 secured to the rotating shaft 34. The strip 31 is therefore rotatable with the shaft 33 and is slidable transversely with respect thereto within the limits defined by the slot 32.

Secured respectively to terminal positions of the strip 31 are two brake pins 35 and 36.

The abutment bearing member is constituted by a ring 37 which surrounds the shafts 34 and 33 and is provided with outwardly directed abutments 38, the ring 37 being fixedly mounted.

In use, upon rotation of the shaft 34 the strip 31 also rotates and, as a result, the pins 35 and 36 successively strike abutments 38 of the ring 37. Upon each striking of the abutments 38 the strip 31 is transversely displaced.

The embodiment just described facilitates the provision of a relatively massive braking member as compared with the braking members employed in the embodiments previously described. It will be appreciated that the more massive the braking member the more effective is the braking for a given size of device.

Figure 6:
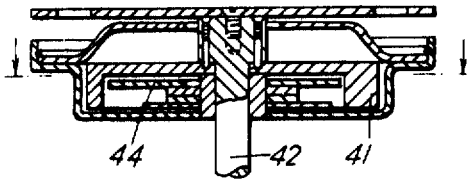
FIGS. 6 and 7 are respectively longitudinal and cross-sectional views of a still further embodiment of such a device.
Figure 7:
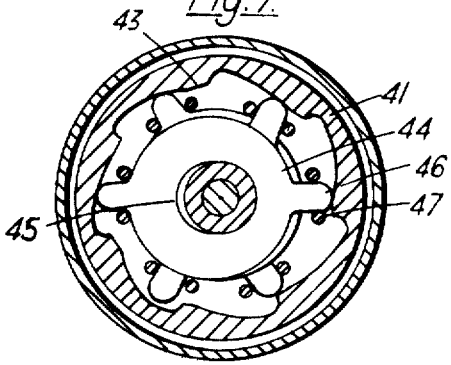

The embodiment shown in FIGS. 6 and 7 is an example of a further variation wherein the abutment bearing member rotates while the braking member is only capable of transverse reciprocal movements. As seen in the figure the abutment bearing member is constituted by a ring 41 which is mounted in the device so as to be rotatable with a central axis 42. The ring is formed with inwardly directed projections 43.

Each braking member is constituted by a disc 44 which has a central aperture 45 through which passes the axis 42 and which is provided with diametrically opposed lugs 46. The disc 44 is so supported as to be capable of transverse reciprocation with respect to the axle 42, the lugs being guided between guides 47. The lugs 46 are adapted to be struck by the projections 43 upon rotation of the ring 41 as a result of rotation of the axle 42. As a result of successive impacts between the lugs 46 and the projections 43 the discs 44 reciprocate transversely and a braking torque is developed.

While the invention has been specifically described with reference to the application of a speed limiting device to a telephone dial mechanism it will be appreciated that the device can equally well be applied to any other form of rotating shaft whose speed of rotation under the influence of an applied torque it is desired to limit.

I claim:

1. A speed limiting device for limiting the speed of rotation of a body adapted to rotate about an axis under the influence of an applied torque and comprising at least one braking member mounted for free sliding movement in a transverse direction with respect to said axis and an abutment bearing member, one of said members being adapted to rotate with said body and the other of said members being secured against rotation and being adapted to be struck by said one member during its rotation, whereby the braking member is constrained to slide in said transverse direction.

2. A speed limiting device according to claim 1, wherein said braking member is articulated to said body so as to rotate therewith.

3. A speed limiting device according to claim 1, wherein the abutment bearing member constitutes said one member and wherein the braking member is secured against rotation.

4. A speed limiting device according to claim 2, wherein the braking member is constituted by a pin located and slidable in a channel formed in a support member carried by said body, said channel being transversely directed to the axis of rotation.

5. A speed limiting device according to claim 2, wherein the braking member is constituted by a disc surrounding the body and rotatable therewith, said disc being provided with a pair of diametrically opposed outwardly directed lugs each of which is adapted to strike at least one abutment carried by the abutment bearing member, said disc being displaceable transversely with respect to the axis of rotation.

6. A speed limiting device according to claim 3, wherein the braking member is constituted by a disc surrounding the body but secured against rotation therewith, said disc being provided with a pair of diametrically opposed outwardly directed lugs each of which is adapted to strike at least one abutment carried by the abutment bearing member which is articulated to the body so as to be rotatable therewith, said disc being displaceable transversely with respect to the axis of rotation.

7. A speed limiting device according to claim 1, wherein said abutment bearing member surrounds said body and the braking member.

8. A speed limiting device according to claim 1, wherein the braking member surrounds the abutment bearing member and the body.

9. A speed limiting device according to claim 1, wherein the abutment bearing member is provided with outwardly directed abutments adapted to be struck by terminal portions of the braking member during rotation of said terminal portions around said abutment bearing member.

10. A speed limiting device in accordance with claim 9, wherein the abutment is provided with a steeply inclined trailing edge and a gradually inclined leading edge.

11. In a telephone dial mechanism, a speed limiting device for limiting the speed of rotation of the dial about its axis under the influence of a manually applied torque, said device comprising a braking member having an element mounted for reciprocal sliding movment in a direction transverse to said axis between a retracted and an extended position, and an abutment member having alternate rise and dwell portions, one of said members being relatively rotatable with respect to the other of said members about said axis, said braking member element when in said extended position and while disposed within one of said dwell portions being in spaced relation with said abutment member and positioned for impact engagement with a next adjacent rise portion upon further relative rotation of said members, whereby relative rotation of said members is accompanied by transverse movement of said braking member element.

12. A speed limiting device for limiting the speed of rotation of a body adapted to rotate about an axis under the influence of an applied troque, said device comprising a braking member having first and second extremities disposed on opposite sides of said axis, said braking member being mounted for reciprocal sliding movement as a unit in a direction transverse to said axis between two predetermined positions, and an abutment member having a plurality of alternately arranged rise and dwell portions, each rise portion having a corresponding diametrically opposed dwell portion, one of said members being relatively rotatable with respect to the other of said members about said axis, said braking member when in one of said predetermined positions having said first extremity retracted and said second extremity extended for engagement with one of said rise portions and when in the other of said predetermined positions having said second extremity retracted and said first extremity extended for engagement with another of said rise portions, whereby relative rotation of said members must be accompanied by reciprocal transverse movement of said braking member between said predetermined positions.

13. The structure of claim 12 wherein there are provided a plurality of brake members with other extremities angularly spaced from one another, whereby relative rotation of said members must be accompanied by sequentially transverse reciprocal movement of said braking members between said predetermined positions.

14. The structure of claim 12 wherein the dimensions of said members are such that each braking member extremity when in its respective extended position is momentarily disengaged from said abutment member prior to engagement with the next adjacent rise portion, whereby said engagement between said extremity and said rise portion is an impact engagement.

References Cited

The following references, cited by the Examiner, are of record in the patented file of this patent or the original patent.

UNITED STATES PATENTS

| | | |
|---|---|---|
| 1,008,635 | 11/1911 | Freer. |
| 1,112,671 | 10/1914 | Brocker et al. |
| 1,976,943 | 10/1934 | Klausmeyer. |
| 2,483,696 | 10/1949 | Giera. |
| 2,550,817 | 5/1951 | Jacobsson et al. |
| 2,738,970 | 3/1956 | Granet et al. |

DUANE A. REGER, *Primary Examiner.*